(12) United States Patent
Tang et al.

(10) Patent No.: US 11,517,493 B1
(45) Date of Patent: Dec. 6, 2022

(54) MOTORIZED CONVERTIBLE KNEE SCOOTER

(71) Applicants: Priscilla Tang, Toronto (CA); Steven Fogel, Hollywood, FL (US)

(72) Inventors: Priscilla Tang, Toronto (CA); Steven Fogel, Hollywood, FL (US)

( * ) Notice: Subject to any disclaimer, the term of this patent is extended or adjusted under 35 U.S.C. 154(b) by 0 days.

(21) Appl. No.: 17/681,756

(22) Filed: Feb. 26, 2022

(51) Int. Cl.
*B62K 3/00* (2006.01)
*A61H 3/04* (2006.01)
*A61H 3/00* (2006.01)

(52) U.S. Cl.
CPC ............. *A61H 3/04* (2013.01); *B62K 3/002* (2013.01); *A61H 2003/002* (2013.01); *A61H 2003/005* (2013.01); *A61H 2003/046* (2013.01); *A61H 2201/0107* (2013.01); *A61H 2201/1207* (2013.01); *A61H 2201/164* (2013.01); *A61H 2201/1633* (2013.01)

(58) Field of Classification Search
CPC ............. A61H 3/04; A61H 2003/002; A61H 2003/005; A61H 2003/046; A61H 2201/0107; A61H 2201/1207; A61H 2201/1633; A61H 2201/164; B62K 3/002
See application file for complete search history.

(56) References Cited

U.S. PATENT DOCUMENTS

| | | |
|---|---|---|
| 810,679 A | 1/1906 | Rudert |
| 1,668,623 A | 5/1928 | Avril |
| 1,917,440 A | 7/1933 | Finkbeiner et al. |
| 2,168,424 A | 8/1939 | Skinner et al. |
| 2,244,869 A | 6/1941 | Everest et al. |
| 2,439,556 A | 4/1948 | Bancroft |
| 3,213,870 A | 10/1965 | Kiehn et al. |
| 3,486,765 A | 12/1969 | Turner |
| 3,596,668 A | 8/1971 | Tosto |
| 4,068,857 A | 1/1978 | Karlsson |
| 4,111,445 A | 9/1978 | Haibeck |
| 4,254,948 A | 3/1981 | Jacobs |
| 4,291,715 A | 9/1981 | Monte |

(Continued)

FOREIGN PATENT DOCUMENTS

KR 102218837 B1 2/2021

OTHER PUBLICATIONS

Centers for Disease Control and Prevention, "Disability and Health Promotion: Disability Impacts All of Us", webpage, retrieved: https://www.cdc.gov/ncbddd/disabilityandhealth/infographic-disability-impacts-all.html on Apr. 28, 2022, USA.

(Continued)

*Primary Examiner* — James A English
*Assistant Examiner* — James J Triggs

(57) ABSTRACT

A convertible, self-propelled, motorized mobility assistance device in a plurality of embodiments is provided, comprising a scooter-like chassis (1400) with support deck (300) portion, a handlebar (700), and at least one removable, interchangeable knee rest (800) or seat attachment (1300); wherein the device is mounted atop and driven by at least three motorized wheels (400, 500) which are connected to a source of power and propulsion (1200), and drive (1100). The device further includes a steering system, braking system, and mechanisms for height-adjustability, comfort, and portability.

19 Claims, 4 Drawing Sheets

(56) References Cited

U.S. PATENT DOCUMENTS

| | | | |
|---|---|---|---|
| 4,867,188 | A | 9/1989 | Reid |
| 5,086,798 | A | 2/1992 | Motts |
| 5,137,102 | A | 8/1992 | Houston, Sr. et al. |
| 5,167,597 | A | 12/1992 | David |
| 5,800,317 | A | 9/1998 | Accetta |
| 5,839,740 | A | 11/1998 | Seeger |
| 5,855,387 | A | 1/1999 | Gill et al. |
| 6,089,586 | A | 7/2000 | Rudell |
| 6,474,666 | B1 | 11/2002 | Andersen et al. |
| 6,848,696 | B2 | 2/2005 | Miller |
| 7,077,229 | B2 | 7/2006 | Lee |
| 7,287,767 | B1 * | 10/2007 | Gomes ............... B62K 3/16 482/68 |
| 7,311,319 | B1 | 12/2007 | Ortega |
| 7,438,302 | B2 | 10/2008 | Nichols |
| 7,780,180 | B2 | 8/2010 | Hoepner et al. |
| 7,828,311 | B1 | 11/2010 | Peridon |
| 7,832,746 | B2 | 11/2010 | Peterson |
| 7,938,413 | B2 | 5/2011 | Anderson |
| 7,959,545 | B2 | 6/2011 | Olexenko |
| 7,980,572 | B2 * | 7/2011 | Bennett ............ A61G 5/0883 280/426 |
| 7,997,597 | B2 | 8/2011 | Mehl |
| 8,348,288 | B1 | 1/2013 | Laughon, Sr. |
| 8,496,257 | B2 | 7/2013 | Walther et al. |
| 8,523,211 | B2 | 9/2013 | Mailahn |
| 8,608,184 | B2 | 12/2013 | Janis |
| 8,720,915 | B2 | 5/2014 | Diaz |
| 8,857,832 | B2 | 10/2014 | Smith |
| 9,010,780 | B1 | 4/2015 | Chiu |
| 9,016,702 | B2 | 4/2015 | Huang |
| 9,211,937 | B2 | 12/2015 | Chen |
| 9,227,684 | B2 | 1/2016 | Smith et al. |
| 9,254,883 | B2 | 2/2016 | Bemndorfer et al. |
| 9,272,739 | B2 | 3/2016 | Zaid et al. |
| 9,409,617 | B2 | 8/2016 | Chen |
| 9,545,969 | B2 | 1/2017 | Byrne et al. |
| 9,834,270 | B2 | 12/2017 | Wright |
| 9,913,773 | B2 | 3/2018 | Karlovich |
| 9,944,338 | B2 | 4/2018 | Behar |
| 10,092,475 | B2 | 10/2018 | Smith |
| 10,245,937 | B2 * | 4/2019 | Gillett ............... B62K 17/00 |
| 10,300,976 | B2 | 5/2019 | Wernli |
| 10,407,117 | B2 | 9/2019 | Allais |
| 10,441,493 | B2 | 10/2019 | Adams et al. |
| 10,717,491 | B1 | 7/2020 | Neville et al. |
| 10,780,938 | B1 | 9/2020 | Van Houten et al. |
| 10,786,418 | B2 | 9/2020 | Karlovich |
| 10,932,984 | B2 | 3/2021 | Mahathalagalage |
| 11,058,593 | B2 | 7/2021 | Hacikadiroglu et al. |
| 11,136,089 | B2 | 10/2021 | Paris et al. |
| 11,311,448 | B2 | 4/2022 | Karlovich |
| 2004/0217565 | A1 * | 11/2004 | Ramm ............... B62K 3/002 280/87.01 |
| 2007/0182116 | A1 | 8/2007 | Davey et al. |
| 2008/0284125 | A1 | 11/2008 | Ramm et al. |
| 2012/0048318 | A1 * | 3/2012 | Zendzian ............ A61H 3/04 297/423.39 |
| 2012/0280467 | A1 * | 11/2012 | Walther ............... B62K 5/05 280/263 |
| 2017/0165146 | A1 | 6/2017 | Franson et al. |
| 2017/0190335 | A1 * | 7/2017 | Gillett ............... B62K 17/00 |
| 2020/0390638 | A1 | 12/2020 | Jernigan, IV |
| 2021/0114681 | A1 | 4/2021 | Bailar |
| 2021/0315767 | A1 | 10/2021 | Schlagheck et al. |

OTHER PUBLICATIONS

Centers for Disease Control and Prevention, "National Center for Health Statistics: Disability and Functioning", webpage, retrieved: https://www.cdc.gov/nchs/fastats/disability.htm on Apr. 28, 2022, USA.

Centers for Disease Control and Prevention, "National Center for Health Statistics: Percentage of any disability for adults aged 18 and over, United States, 2019-2020." National Health Interview Survey. Generated interactively: Apr. 28, 2022 from https://wwwn.cdc.gov/NHISDataQueryTool/SHS_adult/index.html, webpage, retrieved https://www.cdc.gov/nchs/fastats/disability.htm on Apr. 28, 2022, USA.

Coppola, "How To Use The Orthomate Knee Scooter Parking Brake", webpage, retrieved: https://www.rentakneewalker.com/stories/how-to-use-the-orthomate-parking-brake on Apr. 28, 2022, USA.

Evenflo, product information page: "Exersaucer Jungle Quest Activity Center", webpage, retrieved: https://www.evenflo.com/products/exersaucer-jungle-quest-activity-centers on Apr. 28, 2022 USA.

Hansen et al., "Fewer accidents and better maintenance with active wheelchair check-ups: a randomized controlled clinical trial", journal, Sep. 1, 2004, pp. 631-632,635-638, 18(6), Clinical Rehabilitation, retrieved: https://www.deepdyve.com/lp/sage/fewer-accidents-and-better-maintenance-with-active-wheelchair-check-RKw8NNiHKR?, UK.

Hogaboom et al., "Wheelchair Breakdowns Are Associated With Pain, Pressure Injuries, Rehospitalization, and Self-Perceived Health in Full-Time Wheelchair Users With Spinal Cord Injury", journal, Oct. 2018, pp. 1949-1956, 99 (10), Archives of Physical Medicine and Rehabilitation, retrieved: https://www.sciencedirect.com/science/article/pii/S0003999318302338, USA.

Medline, product information page: "Medline Basic Knee Walker", webpage, retrieved: https://www.medline.com/jump/product/x/Z05-PF34577#mrkSpec on Apr. 28, 2022, USA.

Micro, product information page: "Mini Micro 3in1 Deluxe Plus LED", webpage, retrieved: https://www.micro-scooter.com/ch_en/mini-micro-3in1-deluxe-plus-led on Apr. 28, 2022, Switzerland.

MTS Medical Supply, product information page: "The Knee Sling by Mobility Transfer Systems", webpage, retrieved: https://mtsmedicalsupply.com/collections/walkers/products/the-knee-sling on Apr. 29, 2022, USA.

Rahman et al., "Knee Scooter-Related Injuries: A Survey of Foot and Ankle Orthopedic Surgeons", journal, Mar. 30, 2020, pp. 1-7, 5(1), Foot & Ankle Othopaedics, retrieved: https://www.deepdyve.com/lp/pubmed-central/knee-scooter-related-injuries-a-survey-of-foot-and-ankle-orthopedic-LbaZWAaman?articleList=%2Fsearch%3Fquery%3D10.1177%252F2473011420914561#, USA.

Roberts et al., "The Orthopaedic Scooter: An Energy-Saving Aid for Assisted Ambulation", journal, Jul. 1990, pp. 620-621, 72(4), The Journal of Bone and Joint Surgery, retrieved: https://web.archive.org/web/20110809111921/http://web.jbjs.org.uk/cgi/reprint/72-B/4/620.pdf, England.

Scoot & Ride, product information page: "Highwaykick 1—Steel", webpage, retrieved: https://en.scootandride.ca/product-page/highwaykick-1-acier on Apr. 29, 2022, Canada.

Shepard et al., "The Market for Wheelchairs: Innovations and Federal Policy (Health Technology Case Study 30)", government publication, Nov. 1984, pp. 13-20, OTA-HCS-30, Congress of the United States Office of Technology Assessment, retrieved: https://www.princeton.edu/~ota/disk3/1984/8418/8418.PDF , USA.

Tanaka et al., "Invited Review: Dynamic exercise performance in Masters athletes: insight into the effects of primary human aging on physiological functional capacity", journal, Nov. 2003, pp. 2152-2153 and 2159-2160, 95(5), Journal of Applied Physiology, retrieved: https://journals.physiology.org/doi/full/10.1152/japplphysiol.00320.2003 , USA.

United States Census Bureau, "Estimates of the Total Resident Population and Resident Population Age 18 fears and Older for the United States, States, and Puerto Rico: Jul. 1, 2019 (SCPRC-EST2019-18+POP-RES)", webpage, retrieved: https://www.census.gov/data/tables/time-series/demo/popest/2010s-national-detail.html on Apr. 29, 2022, USA.

World Health Organization, "Priority Assistive Products list", handbook publication, Feb. 2016, WHO/EMP/PHI/2016.01, retrieved: https://www.who.int/publications/i/item/priority-assistive-products-list, Switzerland.

\* cited by examiner

MOTORIZED CONVERTIBLE KNEE SCOOTER

BACKGROUND OF THE INVENTION

Technical Field

The embodiments herein specified pertain to mobility assistance devices and more specifically, to wheeled devices for aiding the locomotive mobility by land of persons in a standing, partially standing, or seated posture, having or recovering from: single leg conditions, disability at or below the knee, frailty or impairment below the waist, reduced physiological functional capacity, or surgery.

Discussion of Prior Art

The prior art suggests that a plurality of attempts have been made in the field of mobility assistance devices, claiming solutions for improving the independence and quality of life of affected individuals. Relevant prior art includes crutches, canes, walkers (including wheeled walkers), wheelchairs, knee scooters (herein interchangeably referred to as knee walkers), and devices characterized by a combination thereof, all of which are manually operated or propelled by a user. Power wheelchairs (herein interchangeably referred to as electric wheelchairs) also belong to the prior art. While prosthetic and orthotic devices can be considered as mobility assistance devices, within the context of this specification, they will be considered as complementary.

Affected individuals could include persons having or recovering from: single leg issues, surgery, ankle or foot injuries, disability at or below the knee, frailty or impairment below the waist, or reduced overall physiological functional capacity. Affected individuals may need assistive technology due to older age, chronic or acute noncommunicable diseases or conditions, mental health conditions including dementia and autism, skin conditions, or gradual functional decline. Assistive devices help affected individuals to: compensate for an impairment, compensate for walking that would otherwise be painful or precluded, reduce the consequences of gradual functional decline, reduce the need for caregivers, prevent other health conditions, or lower health related costs. Generally, an affected individual is one who would benefit from assisted walking using a mobility aid, or who has been medically directed to keep his/her body weight off of one leg or lower extremity.

According to current data by the Centers for Disease Control and Prevention, in the United States, more than one in four adults live with a disability, of which 13.7% have a mobility type of disability, defined as adults experiencing serious difficulty walking or climbing stairs. A comparison of health factors reveals that, at rates significantly higher than for those without any disability, adults with a disability are obese (38.2%, compared to 26.2% of adults without a disability), smoke (28.2%, compared to 13.4%), have heart disease (11.5%, compared to 3.8%), and have diabetes (16.3%, compared to 7.2%).

Furthermore, an estimated 50% of people living with mobility challenges are preclinical. This leaves many individuals to manage their unmet mobility and rehabilitation needs without any or adequate support from a medical professional, without using any mobility aid altogether, or without the knowledge and resources to select appropriately from mobility device options.

While millions of Americans rehabilitating an injury or having permanent disability depend daily on mobility assistance devices, crutches remain the most common assistive device used for the rehabilitation of single lower leg conditions. The knee scooter and its various embodiments, is one example of the attempts that have been made over time to design an alternative to crutches for affected individuals.

A known disadvantage of mobility assistance devices in the prior art is associated with a user's uneven body weight distribution. Crutches, canes, walkers, and knee walkers typically demand the user to redistribute and support their body weight such that, in order to operate the device, added injury risk, stress, and force are unnaturally placed on hands, wrists, arms, shoulders, elbows, axilla, hips, legs, ankles, knees, back, or the associated joints and muscles thereof.

Axilla and elbow crutches demand a user to suspend their injured leg off the ground, which causes undue strain on the non-injured leg and axilla or elbows. Knee walkers demand a user to pedal with their ambulatory leg, while flexing their knee to place the non-ambulatory leg on a stationary rest. We have found that a significant amount of body weight is redistributed to the user's non-ambulatory knee for both support and steering when operating a knee walker. This causes excess strain, force, and downward pressure on, and risks further injury to, the user's ambulatory and non-ambulatory legs.

We have also found that for users with a pre-existing knee condition, the knee walker gradually becomes painful to use. The shifting of a user's body weight in order to operate a knee walker in the prior art, risks discomfort, pain, injury, or incorrect positioning, while excluding potential users who have further weakness or injury at or above a knee.

The added demands on a user to redistribute their body weight unevenly in order to operate such mobility aids, limit the user's capacity to operate the device for a required or extended duration without needing to take breaks for rest, which effectively compromises the original purpose of the device to assist mobility.

Another known disadvantage of existing mobility assistance devices is that a user's hands are often not free from operating the device, to use for other purposes. This is especially the case for crutches, walkers, wheelchairs, and knee walkers which demand the use of both arms and hands for propulsion and steering. For affected individuals who need or prefer to be able to safely free at least one hand during the operation of a mobility device, they would be largely limited to using power wheelchairs.

A further disadvantage of existing mobility assistance devices is the lack of options for affected individuals that prefer to remain in an upright posture when standing or moving about. Such individuals would rather be able to maintain their usual standing height and eye level relative to those around them in a given environment. This means that wheelchairs and power wheelchairs, or other devices wherein the operator is seated, do not adequately address the needs of those individuals.

Likewise, affected individuals who need or prefer to move about with speed, are limited to wheeled mobility devices including wheelchairs and knee scooters. Canes, crutches, and walkers typically reduce the walking speed of the user when compared to normal two-leg walking.

Another known disadvantage of existing mobility assistance devices is the physical energy expenditure demanded of its operator. There remains a lack of selection of electrically powered or motorized mobility aids for freeing a user from manual propulsion and allowing greater mobility with less effort. With the exception of power wheelchairs, available mobility aid options including walkers and knee scooters remain as manually propelled devices. They therefore do not address the needs of individuals wanting to move about with greater mobility or ease, or while compensating for a loss of strength, endurance, or physiological capacity.

A known disadvantage of existing mobility assistance devices is lack of portability. Some wheelchairs, power wheelchairs, and knee scooters are heavy, large in shape and size, not collapsible or foldable, and otherwise not designed for any safe transport up stairs or stowing into, for example, a car. Smaller and lighter devices such as crutches and walkers may be more portable than wheelchairs and scooters, however often not: safely, as designed, or without needing assistance from another person.

Few of the available mobility assistance devices allow a user to conveniently or safely free one hand to hold the handrail to climb stairs, while carrying the device in the other hand. For example, users of crutches will commonly climb stairs using one crutch while holding the handrail with their other arm and suspending their non-ambulatory leg off the floor.

Many mobility assistance devices lack the feature of collapsibility for stowing. Knee walkers and wheelchairs that do feature collapsibility, still demand significant effort, strength, assistance, and physical room to safely lift and stow, which is inconvenient for the user.

Another known disadvantage of existing mobility assistance devices is lack of stability or performance over uneven surfaces, inclines, or outdoor terrain, which compromises safety and risks falls or new injuries. Knee scooters are difficult to manually propel, especially on an inclined surface, and knee scooter injuries are known and documented.

In one study, authors from Johns Hopkins University cited that high rates of falls were reported by patients who were medically recommended, and subsequently used, knee scooters after surgery to facilitate weight-bearing restriction. Of the total patients to whom a surgeon postoperatively recommended any assistive device, 69% were recommended a knee scooter. The most common cause of subsequent injury to these patients was making a sharp turn on a knee scooter; and 34% of those injured patients resultantly underwent surgery to treat their new knee scooter-related injuries.

Due to inadequate braking controls and design, wheeled devices including knee scooters, wheelchairs, and wheeled walkers can roll when not in use or are otherwise unstable when used for leverage or support to stand up from another position, or to mount or dismount the device. While wheelchairs may offer greater stability than knee scooters, it is, among several other relative disadvantages, common for wheelchair users to need to possess and store several different mobility aids for use in their various indoor and outdoor environments, which can become unfeasible for many.

Another known disadvantage of existing mobility assistance devices is maneuverability. Wheelchairs are commonly reported as being difficult to steer effectively or with ease, especially among users with reduced physical capacity or lacking overall strength. Despite the availability of power wheelchairs, wheelchairs are difficult to maneuver due to their size, shape, and design, especially when indoors, in tight spaces, or when completing tasks of daily living.

Several attempts in the prior art have claimed improvements to the steering and maneuverability of knee scooters, however, they still demand the operator to manually propel the device forward or backward, while bearing body weight on the handlebar with their hands and arms, and on the knee rest with their non-ambulatory knee, which can make steering difficult, uncomfortable, and unsafe.

Another known disadvantage of mobility assistance devices in the prior art, especially among those providing various transformable or convertible embodiments, is the level of difficulty demanded of a user to switch between configurations. For example, some knee-crutches and walkers with knee rests do not allow affected individuals to conveniently switch between embodiments without requiring extraneous tools, separate and additional storage, or assistance from another person.

Another known disadvantage of conventional mobility assistance devices is their encouragement of excess sitting, when a user could otherwise be standing or moving about in a more active posture. Excess sitting and a lack of physical activity is a recognized health risk. Powered or manual wheelchairs, and other mobility aids that encourage a user to be in a seated posture for prolonged durations, compromise health. Affected individuals that become dependent on seated mobility aids may experience a loss of muscle volume or bone strength in areas normally used for walking, or worsening or declining problems with their legs, joints, balance, or strength.

Affected individuals may find psychological benefits from being able to move about in an upright posture or with a smooth gait when using a mobility assistance device. As such, mobility aids that only allow a user to be seated while in operation may be perceived as less advantageous than those that allow the user to be in an upright or less perceivably confined posture. While canes, crutches, walkers, and knee scooters may allow a user to be upright, they do not adequately address the needs of users who prefer to move about with a smooth gait.

Another known disadvantage of existing mobility assistance devices is durability and maintenance. More specifically, the costs, knowledge, time, and effort demanded of a user are associated with risk of safety consequences due to lack of or inadequate maintenance. Wheelchairs, for the purposes of accessing servicing, are difficult to transport, time consuming, and costly.

One study found that 99% of the wheelchairs of registered users sampled were in need of servicing, and that most users are unable to accurately determine on their own whether their wheelchair needs maintenance. Compared to properly maintained wheelchairs, inadequately maintained wheelchairs pose greater risk to users for accidents, pain, pressure injuries, and re-hospitalization. Power and manual wheelchairs have been reported to last an average lifetime of two to five years. One study estimated total maintenance and repair costs over the lifetime of a wheelchair, to be almost equal to the purchase price of a new wheelchair. Another study, of power wheelchairs, found the lifetime maintenance costs to equal 1.6 times original purchase price.

In clinical practice, weight bearing is prescribed to patients by a physician or surgeon or physical therapist, particularly of orthopedic medicine, for proper healing and new injury prevention. Each orthopedic weight bearing grade defines the amount of weight a patient puts on their injured or post-surgical body part—typically a lower extremity, during a given stage of rehabilitation and according to the patient's recovery progress, surgical procedure, or other clinical factors. The grades of orthopedic weight bearing include: non-weight bearing, touch-down weight bearing (also known as toe-touch weight bearing), partial weight bearing, weight bearing as tolerated, and full weight bearing. Prior art knee scooters provide support at a single weight bearing grade, typically only including patients of non-weight bearing status.

Given the relevant prior art, there remains a need for mobility assistance devices to address the unmet clinical needs of affected individuals. A device offering improved body weight distribution, weight bearing support, locomotion, posture, efficiency, speed, portability, stability, maneuverability, convenience, durability, and patient safety would enable affected individuals to experience improved results.

BRIEF SUMMARY OF EMBODIMENTS

Therefore, the embodiments provide a self-propelled, motorized mobility assistance device that: conveniently converts between a knee scooter, a stand-on scooter, a sit-on scooter, and the manually-propelled configurations thereof; overcomes the discussed disadvantages and shortcomings of mobility assistance devices in the relevant prior art; and offers new and greater variety in features and selection within the field of assistive devices. The embodiments thus provide to affected individuals and users greater freedom of mobility, and therefore independence and participation, thereby improving quality of life.

DETAILED DESCRIPTION OF EMBODIMENTS

Figure 1:
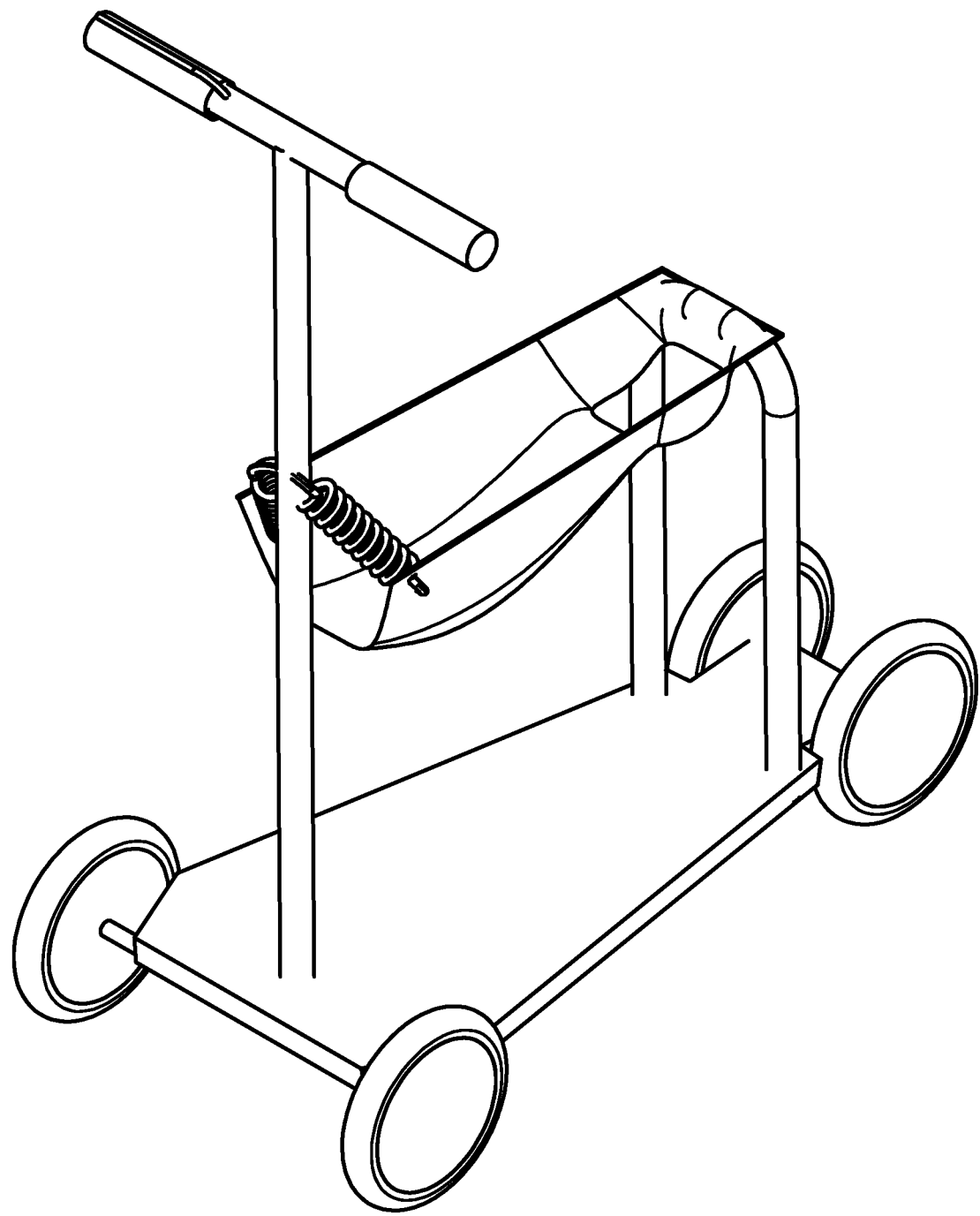
FIG. 1 is the front page view, as an illustration of the invention, for this application.

Advantages of One or More Aspects of Embodiments

An advantage of one or more aspects of the embodiments is a more even distribution of a user's body weight, when compared to mobility devices in the prior art, such that a user in a standing, partially standing, or seated riding posture can more comfortably support their body weight without placing undue stress or injury risk on any particular body part. This enables greater endurance and correct positioning for the mobility aid user.

The embodiments also allow a user to operate the device without putting undue body weight or downward pressure on the handlebars during steering or propulsion, such that the user could briefly and safely free one hand if needed for another purpose, without losing steering control or device propulsion.

A further advantage of one or more aspects of the embodiments is allowing affected individuals to remain in an upright posture, where appropriate. They may find that, in comparison to the embodiments, seated mobility aids in the prior art are less useful, especially if the user would prefer to remain standing or with a smoother gait when moving about. Users of the embodiments may also find health benefits from a reduction in excess sitting or in relying solely on wheelchairs.

An advantage of one or more aspects of the embodiments is the device can be safely driven and maneuvered with ease by a user on most indoor surfaces, outdoor terrain, and inclines while performing adequately in most weather and climate conditions. Such features, enabled in part by the motorized self-propulsion, steering, and braking designs, allow users of the embodiments to move about with greater speed, safety, stability, and ease when compared to normal two-leg walking or manually propelled mobility devices in the prior art. Such features also reduce the physical energy expenditure demanded of the device operator, which allows for greater mobility with less effort.

Another advantage of one or more aspects of the embodiments is portability and convenience. Some embodiments are designed to be easily transformable between configurations, and telescopically height-adjustable to the needs of the user. Some embodiments are also designed to demand less maintenance, in terms of cost and servicing frequency, than wheelchairs.

A folding mechanism enables a user to collapse the device without significant effort or assistance when stowing or transporting, for instance, up the stairs, in a motor vehicle, or when not in use. Lighter materials used for the manufacturing of embodiment parts further provide portability, when compared to mobility devices in the prior art.

Thus, some embodiments provide a convertible mobility aid device that is safer, faster, more portable, and more maneuverable, thereby allowing an affected individual or user to accomplish more tasks of daily living with greater ease and comfort than devices in the prior art. These and other benefits of one or more aspects will become apparent from a consideration of the ensuing detailed description.

Detailed Description of the Structure and Operation of Specific Embodiments

While the device can exist in many different configurations, the embodiments shown generally in the drawings and discussed in this specification are meant to be explanatory and exemplary of the principles of the device, without limiting the application, details, or breadth of all possible aspects or embodiments. A person skilled in the art would be able to identify possible substitutions, alterations, and modifications to the embodiments without departing from the scope of the claims.

Figure 2:
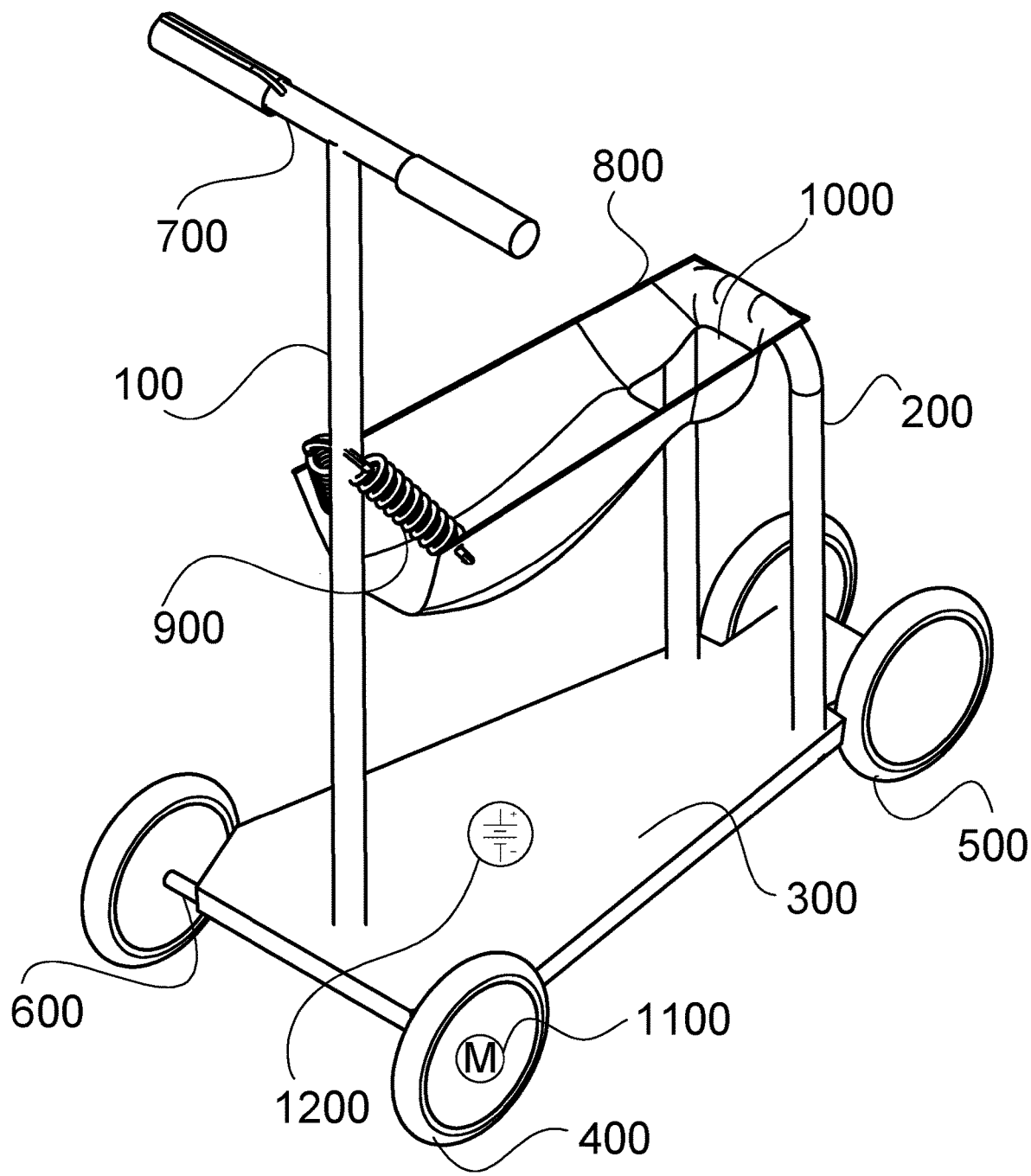
FIG. 2 is a perspective isometric view of a first embodiment.
Figure 3:
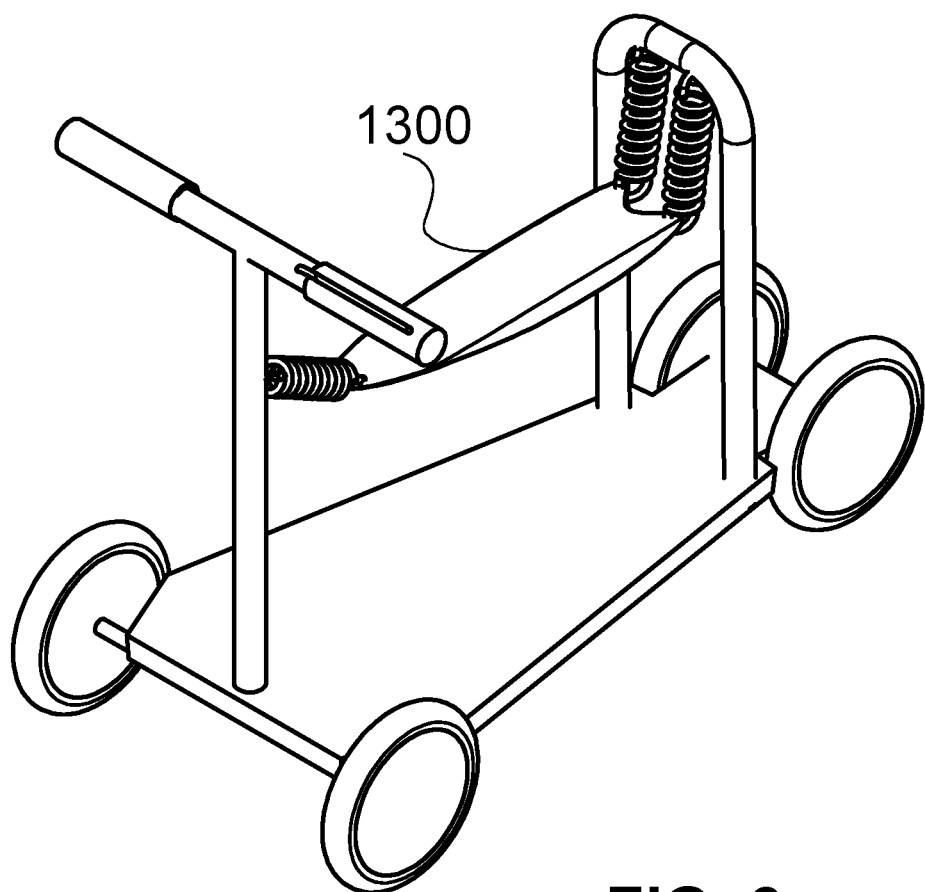
FIG. 3 is a perspective isometric view of a second embodiment.
Figure 4:
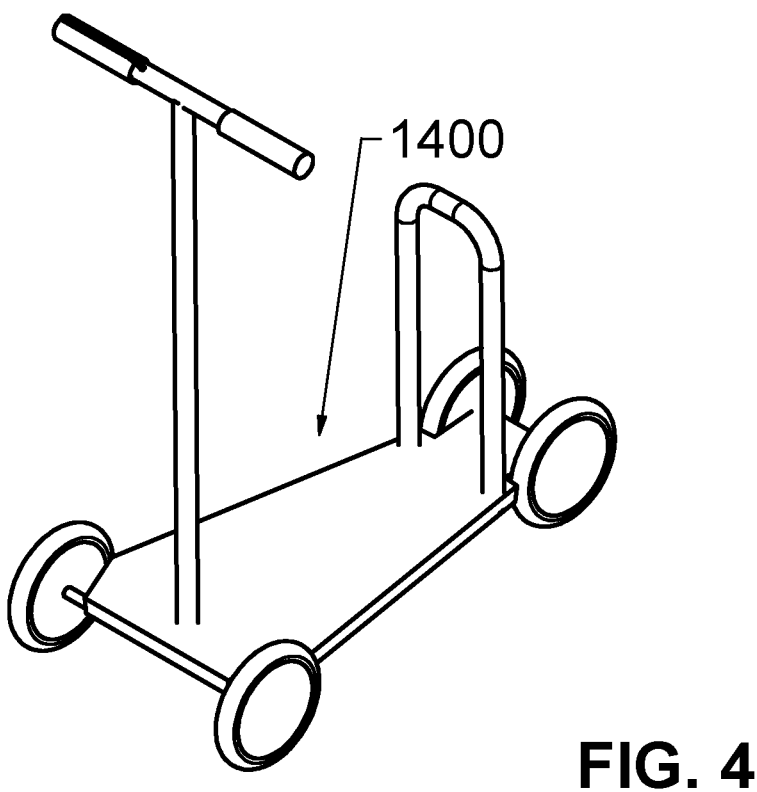
FIG. 4 is a perspective isometric view of a third embodiment.

Referring to the drawing figures, FIGS. 2, 3, and 4 are perspective isometric views of specific embodiments in various configurations, shown generally.

FIG. 2 shows a first embodiment of the device including a removable knee sling or knee rest (800) that is attached to the device chassis (1400) along the telescopically height-adjustable rear tube (200) and head tube (100) using at least one shock-absorbing connector (900). The configurations shown in this embodiment allow the user to rest one lower extremity on the knee sling (800) while operating the device in a standing position with their other leg on the support platform or deck (300) of the chassis (1400).

The knee sling (800) is constructed mostly of fabric and foam materials, or a comparably strong yet thin or flexible, compressible material that can be shaped or formed to comfortably support the user's knee, shin, and foot or an amputee's lower extremity. The knee sling (800) can also include a foot opening or hole (1000) for receiving and supporting the user's foot in a comfortable position. The knee sling (800) can include grommets along the edges of the fabric and foam material, for securely receiving a shock-absorbing connector (900) by a hook end.

FIG. 3 shows a second embodiment of the device including a removable seat attachment or seat rest or seat sling (1300) that is attached to the chassis (1400) using at least one shock-absorbing connector (900). The seat attachment (1300) is constructed mostly of fabric and foam materials, or a comparably strong yet flexible and compressible material that can be shaped or formed to comfortably support the user's body weight in a seated position. The seat attachment (1300) can include grommets along the edges of the fabric and foam material, for securely receiving a shock-absorbing connector (900) by a hook end.

FIG. 4 shows a third embodiment wherein any sling or rest attachment (800, 1300) is detached from the device chassis (1400), to allow for the user to be in a fully standing position with both feet on the deck (300), while operating the device. This configuration may be appropriate for users who have an overall reduced physiological functional capacity without a specific non-ambulatory lower limb.

Specific embodiments including those shown in FIGS. 2, 3, and 4 are structured generally by a wheeled chassis (1400) and handlebar assembly (1500). The chassis (1400) comprises a telescopically height-adjustable head tube (100) and rear tube (200) that are vertically attached to a deck (300), such that the device can be conveniently raised or lowered to different heights based on the size of the user and chosen device configuration. Two sets of motorized wheels (400, 500) are rotatably attached to a front axle (600) and a rear axle, which are laterally and rotatably mounted to the underside of the deck (300), at the front and the rear of the device.

Figure 5:
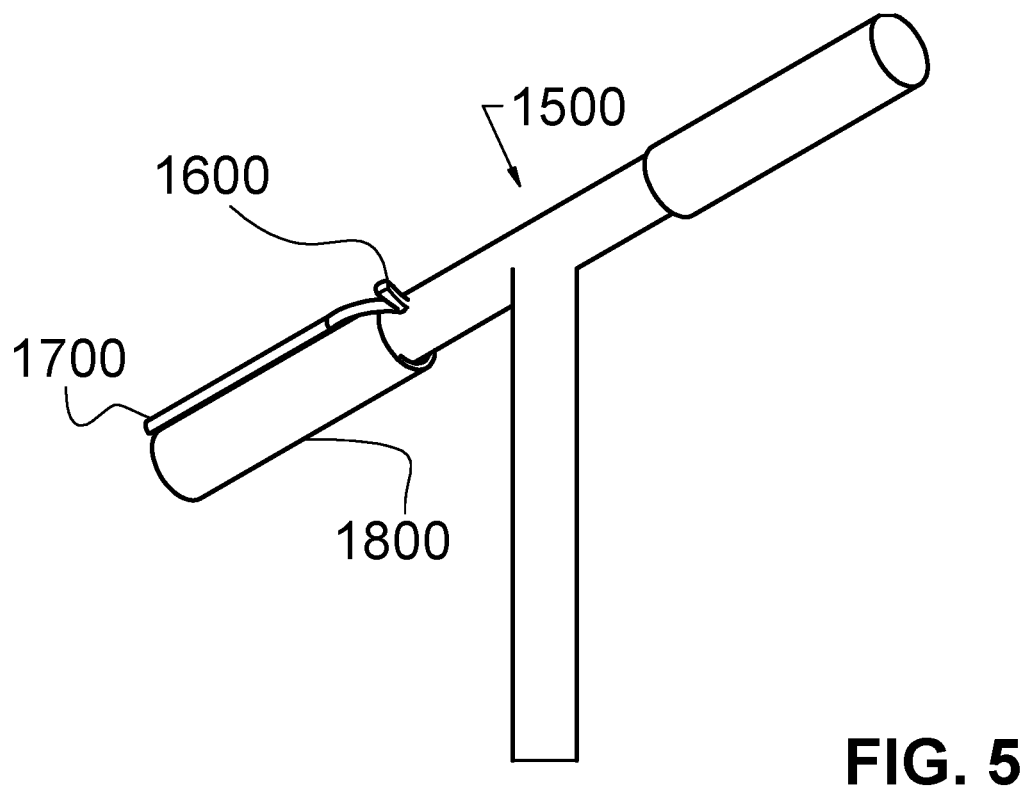
FIG. 5 is an enlarged perspective isometric view of a handlebar assembly.

FIG. 5 shows an enlarged view of a handlebar assembly (1500) wherein the handlebar (700) is forged perpendicularly to the head tube (100) and laterally to the chassis (1400). Therein contained is a steering assembly, which can include mechanisms that provide stability and ease of safe maneuverability, for example, an automotive-style tie-rod steering mechanism.

The two opposing ends of the handlebar assembly (1500) include hand grips (1800), one of which is to be designated to activate a twist throttle or comparable mechanism for controlling the drive and acceleration of the device. On the left or right side of the handlebar assembly (1500) where the throttle control is designated, a hand brake or brake lever (1700) or similar mechanism controls a device braking system that activates deceleration from at least one of the wheels. The brake lever (1700) optionally includes an additional button or switch (1600) for engaging a parking brake, which prevents the device from rolling when not in operation.

The head tube (100), rear tube (200), handlebar (700), axles (600), and other device parts or members can be made mostly of a metal or metal alloy material including steel, titanium, aluminum, chrome, or another malleable yet durable material, or a combination of materials thereof. For example, materials that are commonly available, inexpensive, and used for manufacturing the chassis of manual wheelchairs or bicycles would be appropriate.

The hand grips (1800) can be made of rubber, silicone, plastics including polyurethane, or a material that is comparably soft, flexible, resilient, insulating, and non-slip, or a combination of materials thereof.

Each device part or member that makes direct contact with the user or a ground surface, including the wheels (400, 500), grips (1800), and deck (300) may also have a textured surface for improving grip, comfort, safety, and performance.

The shell or outer surface of the deck (300) can be made of an insulating yet somewhat flexible material that can withstand indoor and outdoor use, such as plastic including polyurethane, carbon fiber, fiberglass, or another available material that is commonly used to manufacture electric mobility or micromobility vehicles.

The deck (300) can contain electrical and mechanical components of the device, including a battery (1200, represented in FIG. 2 by a symbol for multi-cell battery, also shown under the subheading "List of Reference Numerals"). The wheels (400, 500) can contain or be connected to at least one brushed or brushless motor (1100, represented in FIG. 2 by the encircled letter "M") at least at a front wheel, rear wheel, both, or more.

The device wheels (400, 500) may be solid or inflated tires, and of sufficient size and capacity to support the weight of both the device and the user. The wheels can be exchangeable to accommodate various applications including indoor and outdoor use. The wheel hub casing can be made of plastic, carbon fiber, fiberglass, or rubber, or a comparable material, or a combination of materials thereof.

The device can, at various points along the chassis (1400), optionally include at least one connector mechanism or system for suspension, shock-absorption, or maintaining wheel traction with the ground. Such mechanisms as a shock-absorbing connector (900) can be a coil spring, leaf spring, strut assembly, or other comparable part that is made of a durable and sufficiently weight-bearing metal or metal alloy, or a combination thereof, and is shaped for coupling to the device chassis (1400) by a hook end, for absorbing or dampening shock that would otherwise be transferred to the user during device locomotion, thereby allowing for greater comfort and a smoother ride.

In some embodiments, the seat attachment (1300) can additionally include a stability tube or rod assembly that is folded along the underside of said attachment in a fully collapsed position. When connected to the device chassis (1400), said stability assembly can be unfolded for removably attaching opposably at the seat underside and the deck (300) surface, such that additional stability and support are provided to the operator in a seated position. In other embodiments, said stability assembly can instead be located along the rear tube, such that in its fully collapsed position, said assembly is contained within, or folded along said rear tube, and can be unfolded for removably attaching opposably at the seat (1300) underside and the deck (300) surface, such that a seated user is able to operate the device with greater stability and control.

According to the specific embodiments shown in the drawings, the wheels (400, 500) are at least 6.5 inches in diameter. The deck (300) is trapezoidal in shape, such that the shortest deck edge along the rear end of the device, measuring at least 5.5 inches, is shorter than the deck edge along the front end of the device, measuring at least 14 inches. The distance between said deck (300) edges is at least 24 inches in length, however, for some embodiments this distance can be greater in order to more comfortably accommodate taller users. The deck (300) can be of another appropriate geometric shape or size for accommodating the needs of the user of an embodiment. The handlebar (700) length can be approximately equal to or less than the lateral width of the front edge of the device, which includes the width measurements of the front wheels (400) and deck (300) edge. In specific embodiments, this measurement totals approximately 17 inches. The head tube (100) is at least 24 inches in length and the rear tube (200) is at least 16.5 inches in length, in the most collapsed position, and both tubes are telescopically height-adjustable to accommodate users of up to 6 feet 2 inches in height, in a standing or resting position.

A person skilled in the art will appreciate that the possible embodiments of this disclosure can be constructed of materials of sufficient durability, strength, capacity, cost, and weight to perform adequately under most conditions, while allowing for device portability and affordability.

Various configurations of the embodiments are possible for the user to operate the device in different positions including fully standing, partially standing, or seated. In all embodiments, the user may conveniently and safely convert the device between configurations, without requiring additional tools or exceptional training.

Figure 6:
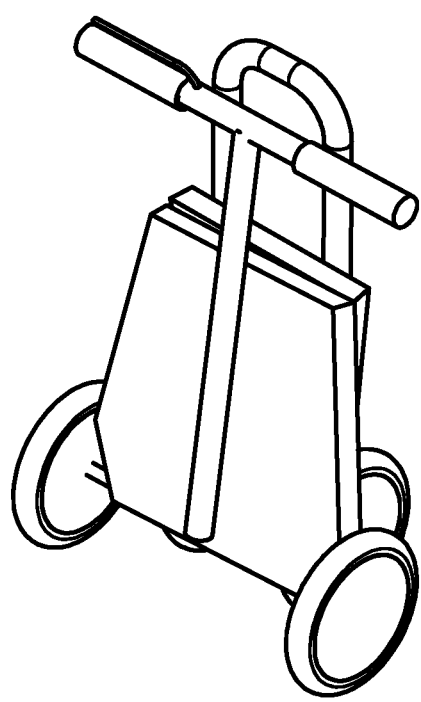
FIG. 6 is a perspective isometric view of an embodiment in a folded position.

Some embodiments provide a foldable and collapsible chassis (FIG. 6) that allows the user to collapse the device for portability, for example when transporting and stowing the device in an automotive vehicle or climbing stairs. Said chassis also allows members including the rear tube to fold at points, such that said tube forms a 90 degree angle and a seat attachment can be attached.

In some embodiments, the option for a user to operate the device by manual propulsion, instead of motorized self-propulsion, is available without requiring undue physical exertion.

The device can be powered by battery and driven by motor. In specific embodiments, an electric brushless hub motor drives the front wheels. The motor can also be a brushed motor, or located within the chassis. Variations for propulsion and power are possible including electricity, fuel, or other propulsion types.

An electric hub motor assembly can optionally provide a further propulsion means to the device by regenerative braking, wherein mechanical energy from braking is transferred to the electrical load for later use.

The battery can be made of lithium ion battery cells or any other type of cell that is commonly available and manufactured, durable, rechargeable, and that holds and produces sufficient power to compatibly drive the device while supporting the user at a maximum body weight, at speeds up to twice faster than normal two-leg walking speeds, and for a range or distance needed in a day by an average user.

Several alternative embodiments and device forms are possible with any combination of functional assemblies without departing from the scope or advantages of all possible embodiments. Various aspects of the embodiments may be used alone or in a variety of arrangements that may not be explicitly discussed in this specification. A person of ordinary skill in the art would appreciate the various features, aspects, and functions of the embodiments, and the possible combinations and variations of components and assemblies that would constitute the claimed mobility device.

| List of Reference Numerals | |
|---|---|
| Reference Numeral | Name of Part |
| 100 | head tube |
| 200 | rear tube |
| 300 | support platform, deck |
| 400 | front wheel |
| 500 | rear wheel |
| 600 | axle |
| 700 | handlebar |
| 800 | knee sling, knee rest |
| 900 | shock-absorbing connector |
| 1000 | foot opening, foot hole |
| 1100 | motor |
| 1200 | battery |
| 1300 | seat attachment, seat sling, seat rest |
| 1400 | chassis |
| 1500 | handlebar assembly |
| 1600 | parking brake |
| 1700 | hand brake, brake lever |
| 1800 | hand grip |

We claim:

1. An assistive device, allowing an individual user to adjust and restrict their orthopedic weight bearing and to ambulate, comprising:
   a. a chassis having at least one head tube, at least one rear tube, a steering assembly, and a support platform;
   b. a removably attachable sling rest for mounting to the head tube and the rear tube of said chassis, said sling rest allowing said user to rest one lower extremity or to be seated while operating said device; and
   c. at least three motorized ground-engaging wheels for supporting or driving said device,
   whereby said device will self-propel along a surface to provide to said user locomotive mobility and adjustable support at all orthopedically prescribed grades of weight bearing.

2. The device of claim 1, further including a handlebar assembly that is connected to the head tube of said chassis, on which a steering means, a throttle means, and a braking control means are accessible.

3. The device of claim 1, wherein at least one motor is housed by said device.

4. The device of claim 1, wherein said sling rest is interchangeable and attachable to said chassis by at least one connector means; said sling rest being constructed of and structured by fabric material.

5. The device of claim 1, wherein said sling rest, in an embodiment, includes an opening for placing the foot of said lower extremity.

6. The device of claim 1, wherein said chassis is foldable or collapsible.

7. The device of claim 1, wherein the rear tube of said chassis, in an embodiment, is U-shaped such that adequate clearance exists between the foot of said user and the rear tube of said chassis, when said user rests a lower extremity in said sling rest from a standing position.

8. The device of claim 1, wherein said sling rest may be detached from said chassis for operating said device in a fully standing position.

9. The device of claim 1, wherein said chassis contains at least one rechargeable battery for powering said device.

10. The device of claim 1, wherein the head tube and the rear tube of said chassis are telescopically height-adjustable to the needs of said user.

11. A multifunctional vehicle comprising a motorized knee scooter including a sling rest, such that an individual person can adjust and restrict their orthopedically prescribed weight bearing on a lower extremity; said sling rest being constructed of and structured by fabric material, and, in an embodiment said sling rest contains an opening for placing the foot of said lower extremity; said vehicle having a chassis.

12. The vehicle of claim 11, wherein said sling rest is removably attachable to said chassis, allowing said person to rest one lower extremity from a standing position, or to sit, or to operate said vehicle in a fully standing position with said sling rest detached.

13. The vehicle of claim 11, wherein said sling rest is connected to said chassis by at least one connector means.

14. The vehicle of claim 11, further including at least three ground-engaging wheels.

15. The vehicle of claim 11, further including a handlebar on which a steering means, a throttle means, and a braking control means are accessible.

16. The vehicle of claim 11, wherein said chassis is foldable or collapsible, and contains at least one rechargeable battery for powering or propelling said vehicle.

17. The vehicle of claim 14, wherein said chassis or at least one of said wheels contains a motor for driving said vehicle.

18. The vehicle of claim 11, further including at least one steerable head tube and at least one rear tube that are telescopically height-adjustable to the needs of said person.

19. A method of manufacturing a motorized orthopedic mobility scooter, comprising:
   a. opposably mounting at least one steerable head tube and at least one rear tube to a support platform;
   b. suspending a detachable sling rest between said head tube and said rear tube using at least one connector means, said sling rest providing adjustable orthopedic weight bearing support to an individual user that is seated or standing and resting one lower extremity in said sling rest;
   c. mounting at least three ground-engaging wheels to the underside of said support platform;
   d. containing within the chassis of said scooter, at least one rechargeable battery; and
   e. containing within the chassis of said scooter or at least one of said wheels, a motor,
   whereby said scooter will self-propel along a surface to provide locomotive ambulation and adjustable grades of weight bearing support to said user.

\* \* \* \* \*